Patented Aug. 17, 1937

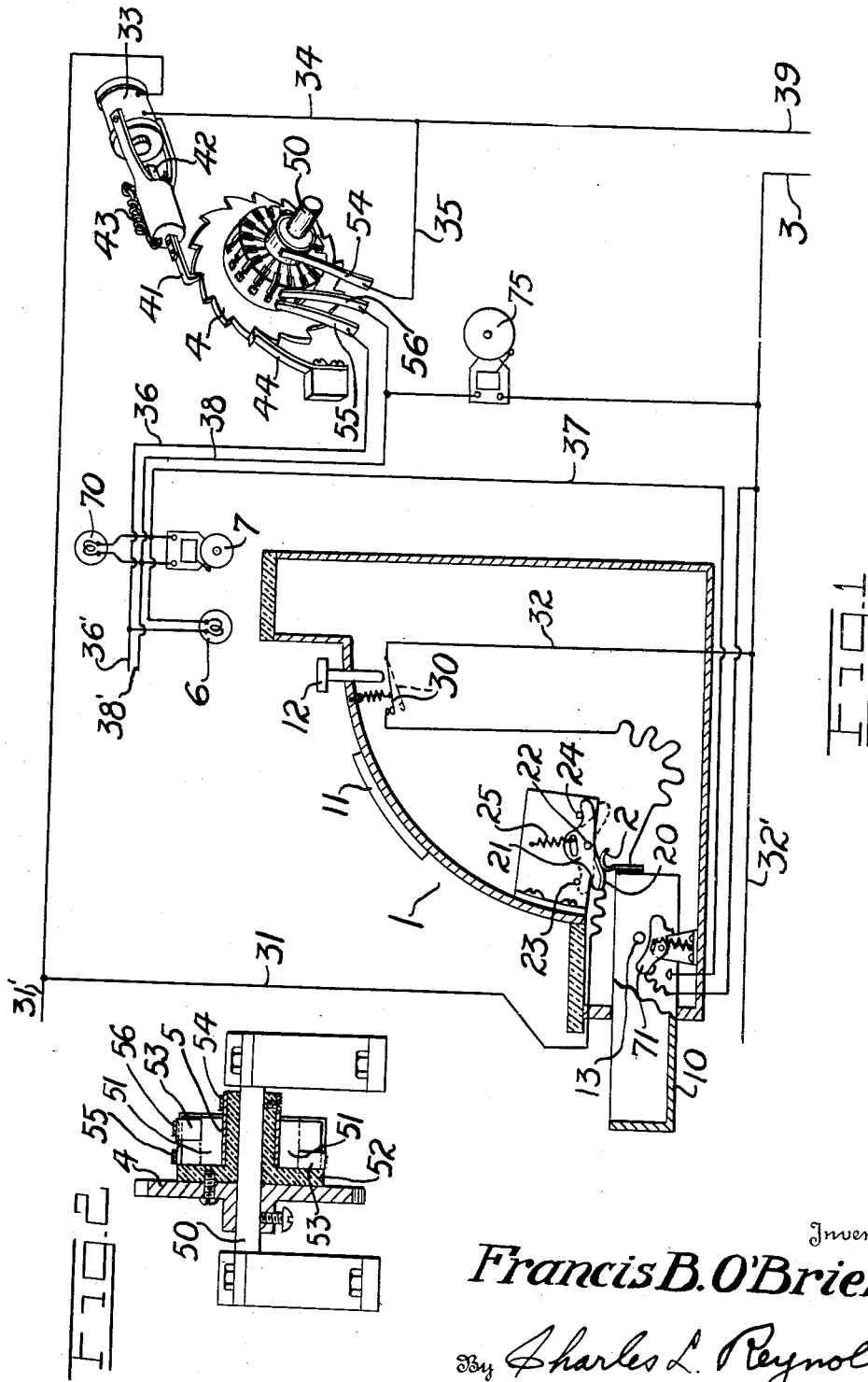
Aug. 17, 1937.     F. B. O'BRIEN     2,090,225
PILFERING DETERRENT SYSTEM
Filed Oct. 30, 1933     2 Sheets-Sheet 1
Inventor
Francis B. O'Brien
By Charles L. Reynolds
Attorney

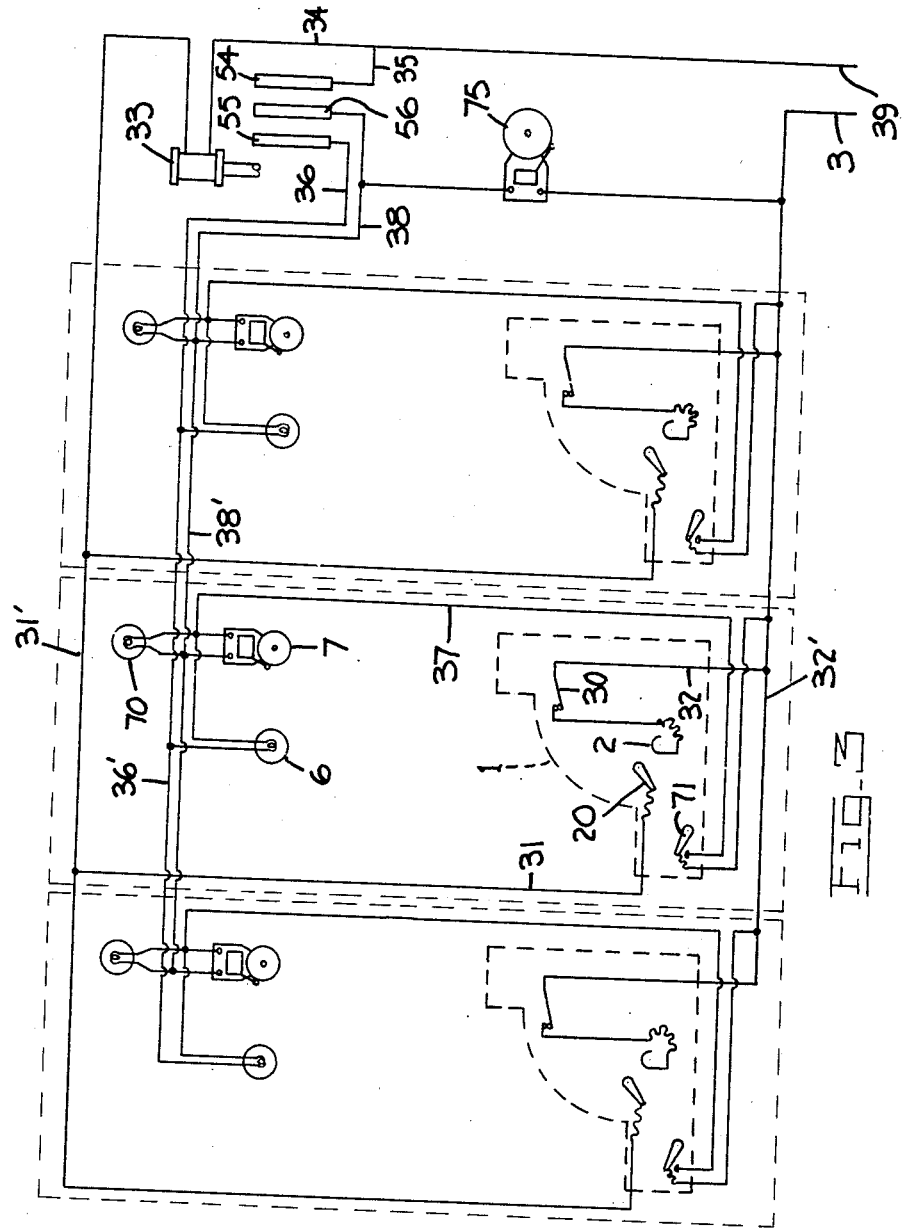

2,090,225

UNITED STATES PATENT OFFICE 2,090,225

PILFERING DETERRENT SYSTEM

Francis B. O'Brien, Everett, Wash.

Application October 30, 1933, Serial No. 695,803

6 Claims. (Cl. 235—23)

My invention relates to means whereby petty pilfering from cash registers in stores can be rendered unlikely.

Cash registers are frequently so constructed that a light shows to illuminate the amount rung up, or a bell sounds with the opening of the drawer, but while in theory this will attract the customer's attention, in practice the customer is not particularly interested in the operation of the cash register, and it is possible for the clerk to ring up less than the amount of the sale and to abstract the difference for his own pocket. Even the practice of handing the customer a cash register printed receipt does not act as a great deterrent against such practices, for if the receipt is wrapped in the package it does not come to the customer's attention until he has reached home, and even if he should notice the difference in the amount of the slip and the amount he paid, assuming he remembers the exact amount he paid, there is no particular incentive for him to inform the store management (he having received the proper change), and if the slip is handed directly to the customer he does not usually retain the slip nor pay any particular attention to it.

It is an object of this invention, then, to devise apparatus whereby the customer is induced to watch the cash register at the time the sale is rung up, for the reason that there may be some reward come to him immediately if an indication to that effect is given at the cash register; if he notices a discrepancy at that time between the amount rung up and the amount of his purchase, he will be far more likely to call it to the attention of the management, especially if the value of the reward is dependent upon the amount of the purchase. In any event, if the indication requires checking by a manager, he will note any discrepancy; all of this will deter "knocking down" from the register.

The general object of the invention, then, is, as indicated above, to induce the customer to watch the cash register and therefore to note, at the time of the purchase, any discrepancy between the amount rung up and the amount of his purchase, and other objects, chiefly those to eliminate fraud or collusion between the clerk and the customer, will be understood as this specification progresses.

My invention comprises the novel system as a whole, and the novel parts thereof, as will be understood from the drawings and from this specification, including the claims.

In the accompanying drawings I have shown in diagrammatic form apparatus which may be employed to carry out my invention, it being understood that the mechanical or electrical forms shown, or both, may be widely altered within the scope of the invention as defined in the claims.

Figure 1 is a general diagrammatic illustration of a cash register system, incorporating my improvement.

Figure 2 is a detail axial section through control mechanism employed in my system.

Figure 3 is a diagrammatic view of a system employing several, in the particular case shown, three, cash registers connected to control a common signal and signal operating mechanism.

The cash register, generally indicated by the numeral 1, incorporates one or more cash drawers 10, an operating button, handle, or motor key 11, a "no sale" key 12, and the usual registering tabs and operating keys therefor, which are not shown. The register may be mechanically or electrically operable. Since the electrical arrangements illustrated, which form part of my invention, need be in no wise connected to the operating circuits of an electrically operated register (and preferably are entirely separate), and since my invention will operate in conjunction with any register, whether mechanically or electrically operated, I have not shown any operating circuits for the register itself.

I employ two circuits, a control circuit operating to advance a master control device with each opening of a drawer, and a signal circuit including and controlled by this master control device, whereby two types of signals are given, a normal signal for most sales, but for selected sales, and at selected, usually irregular intervals, a special signal, indicating that the customer is to be given a rebate, discount, or reward of some sort. The two circuits may have certain common leads, as a common return lead, but generally speaking are separate.

The control circuit includes, in order, the lead 32 from one side 3 of the main supply, a fraud preventive switch 30, a switch comprising the drawer-supported terminal 2 and the terminal 20, the lead 31, the electromagnet 33 or equivalent motor means, and the return lead 34 to the opposite side 39 of the main supply. Where additional registers are connected in the same system, each may be connected in parallel by the leads 31' and 32'. Just as contact between the terminals 2 and 20 will energize the electromagnet 33 (the switch 30 being then closed), so will this same electromagnet be energized by contact between similar terminals at other cash registers. Several different registers, then, can all be connected to operate the same control circuit, in which case they will be connected with the same signal circuit. If for any reason it is desirable to do so, the several registers may operate their individual control devices and signals, but this is not the preferred arrangement.

As stated, at each cash drawer is located a pair of terminals 2 and 20, in the control circuit. One of these, as the terminal 2, is movable with the drawer; as shown it is secured thereon. The complementary terminal 20 is positioned to be engaged and shifted by the contact 2 as the drawer moves towards open position. Since it is desirable to make contact between these two terminals 2 and 20 only as the drawer commences to open, and not when it is shut, the terminal 20 may conveniently be formed upon one arm of a lever 21, pivoted at 22 upon the cash register frame, and movable from the full line position to the dotted line position of Figure 1 upon opening of the drawer 10 and contacting of the terminal 2 with and its movement past the terminal 20. Suitable stops 23 and 24 limit movement of the lever 21, and a spring 25 serves as a snap-over device to move the lever quickly from one position to the other, once the spring has been moved past the line joining its support with the pivot 22. Thus as the drawer moves outwardly the terminal 2 contacts with the terminal 20, and snaps the lever 21 into the dotted line position, and upon closing the drawer the terminal 2 contacts with the opposite arm of the lever, missing the terminal 20, which is now raised, and snaps the lever back into operative position, wherein upon reopening the drawer the terminals again come into contact. It will be evident that many suitable devices to accomplish this end might be devised, the essential thing being that contact is established upon commencement of the opening of the drawer, is brief, and that the contact be not repeated upon closing the drawer.

With the exception of the switch 30, the only switch requiring to be closed to energize the electromagnet 33 is that between the terminals 2 and 20. Energization of this magnet effects an advance of the control device, as will appear in detail hereafter, and since the cash drawer opens each time the register is operated, even under the influence of the "no sale" key 12, it is necessary, to prevent fraud, or collusion between the clerk and the customer, to cut the control circuit, thus preventing advance of the control device, when the "no sale" key is pressed. Thus the switch 30 is interposed in this control circuit. It is normally spring-held in closed position but so located as to be opened by depressing the "no sale" key 12. Since the keys of cash registers are normally held depressed automatically until the cash drawer has been opened, it is clear, and it is the intention, that the switch 30 will be held open, after pressure of the "no sale" key, until after the terminal 2 has contacted with the terminal 20 and thrown the switch lever 21 to the dotted line position, in which case it will be evident that the circuit cannot be completed by contact of the terminals 2 and 20.

At the control station is disposed a device arranged to be advanced step-by-step with each energization of the magnet 33. Thus a ratchet wheel 4 is engaged by a dog 41 to which is connected an armature 42 arranged to be attracted by energization of the magnet 33. A spring 43 returns the armature 42 and the connected dog 41 upon deenergization of the magnet 33. A holding pawl 44 may be employed to prevent reverse movement of the ratchet wheel.

This step-by-step advance means effects the advance of the control device in the signal circuit. This control device receives current from one main 39 by a lead 35, and delivers it either to a lead 36 or a lead 38. Two kinds of signaling devices, the one a normal signal such as a green light 6, the other a special signal such as a bell 7 or red light 70, or both, are connected in the signal circuit at each register. The two signals at each register may be connected to a common return lead 37 which is individual to that register, and which connects with the other main lead 3. Preferably each of these leads 37 includes a normally open switch 71, which may be similar in form to the switch 2, 20, and which should be located for closing by the lug 13 on the drawer, as the latter opens, but preferably only after the switch 2, 20 has been closed and reopened. This switch 71 is opened again by closing of the drawer.

Connected to the ratchet wheel, either directly or through any type of driving means, is the main control device, which may take various forms. As shown it is in the form of a commutator switch. Current is supplied from the lead 35 through a brush 54 to a sleeve 5 supported upon an insulating drum 52 secured to rotate with the ratchet wheel 4 and shaft 50. In contact with the sleeve 5 and insulated from each other by the drum 52 are the contact segments or plates 51, each one terminating short of the periphery of the insulating drum. Clips 53 may be slipped upon the plates 51, either in position to be contacted by a brush 55 leading to the normal signals 6, or to be contacted by a brush 56 leading to the special signals 7 and 70. Usually a given plate or segment is not provided with a clip at more than one position, hence through this plate, when it is brought into proper position, only one kind of signal can be energized, not both kinds. The clips for contact by the brush 56, to energize the special signals, would be comparatively few in number, and irregularly spaced. Their number and spacing is easily varied by relocation of the clips 53.

Upon contact of the brush 55 or 56 with a clip, as the drum is advanced, the appropriate signal 6 or 7 (and 70) is energized, provided the switch 71 is closed. Since it is desired to give a signal only at the register used in making a sale, the switch 71 at each register is normally held open, preventing any signal being given at that register until after the drawer has been opened, thus to close the switch 71. If a special signal (bell or red light) has just been given, say at another register in the system, to avoid disputes it is necessary that the control device be advanced by one step before another signal (usually a normal signal or green light) be given, hence the switch 71 is so located that it can not be closed to energize a signal for its register until the control circuit has been closed and reopened, at the switch 2, 20, thus accomplishing an advance of the control device from the position wherein it had energized the special signal.

As the cash drawer slides open in response to pressure upon the operating handle 11 contact is established in the manner previously described, causing the advance by one step of the main control. The green light 6 will be illuminated, but it will be understood that this alone does not indicate any more than the ringing up of a sale. However, if with this advance the brush 56 comes into contact with a clip 53, the circuit including the red light 70 and the bell 7 will be energized, and this bell will sound at the register, and the red light thereat will be illuminated until the signal circuit is broken at the switch 71 by closing the drawer. Ringing of the bell or illumination of the red light indicates to the customer that on this particular sale he is entitled to a premium or discount of some sort, and in anticipation of its lighting up, he will watch closely at each sale. Another bell or gong 75 may be located, if preferred, in a conspicuous spot in the store, not necessarily adjacent the register, and it is connected in the signal circuit to sound whenever a special signal at any register is energized, thus indicating to all within the store that a sale which carries a rebate has been made.

It will be evident that without the provision of the switch 30 it might be possible to indicate a rebate when the register had been operated merely by operation of the "no sale" key, but with the switch 30 opened upon each pressure of the "no sale" key it will be evident that no advance of the master control device can occur since the main circuit through the contacts 2 and 20 is broken in such cases.

With a device of this sort the customer is induced to watch the register closely with each purchase, for he never knows when his sale may cause the red light to burn, and since the location of the clips 53 may be changed from time to time the customer may never know what cycle of operation will produce the sounding of the signals 7 and 75 or the illumination of the signal 70, and he is consequently alert to each indication at the time of ringing up a sale. Moreover, because the cash register is employed only for cash sales it will be evident that such a system will stimulate cash sales rather than the use of charge accounts. It will stimulate the customer to watch the cash register and thus operate to prevent pilfering by clerks, and the sounding of an audible signal, such as the bell 7 or the gong 75, will indicate to all in the vicinity that rebates or premiums are actually granted from time to time, and thus the confidence of customers in the integrity of the system will be stimulated by their witnessing the giving of rebates or premiums.

What I claim as my invention is:

1. In combination with a cash register drawer, a control circuit, a signal circuit, control circuit switch means closed by slight movement of said drawer toward open position, and opened by further movement of the drawer to a partially open position, and signal circuit switch means closed by further opening movement of the drawer beyond the partially open position at which said control circuit switch means are opened.

2. In combination with a cash register drawer, a control circuit, a signal circuit, control circuit switch means shiftable between an "on" and an "off" position, means operated by said drawer to throw said control circuit switch means to "off" position by opening movement of the drawer to a partially open position, signal circuit switch means shiftable between an "on" and an "off" position, and means operated by said drawer to throw said signal circuit switch means to "on" position by opening movement of the drawer beyond the partially open position at which said control circuit switch means is thrown to "off" position, and said second drawer-operated means acting to throw said signal circuit switch means to "off" position by closing movement of the drawer to a partially closed position, and said first drawer-operated means acting to throw said control circuit switch means to "on" position by closing movement of the drawer beyond the partially closed position at which said signal circuit switch means is thrown to "off" position.

3. In a cash register system, in combination, a cash register drawer, a signal device, a signal circuit therefor, a control device movable step-by-step, means actuated by operation of said register to advance said control device one step for each register operation, circuit-closing means in said signal circuit carried by said control device and closed for periods of one step at intervals of a plurality of steps, and switch means in said signal circuit closed by each opening movement of the cash register drawer and opened by closing movement of the drawer.

4. In a cash register system, in combination, a plurality of cash registers disposed remote from each other, a plurality of signal devices, one for each register located adjacent thereto, a control device movable step by step common to all said cash registers and in circuit with all said signal devices, means to move said control device one step at a time, a plurality of switches connected in parallel in circuit with said means, one for each cash register, and each energized independently and momentarily to advance said common control device one step by operation of its cash register, a signal switch for each signal device closed only by and during operation of its cash register, and a circuit-closing switch in series with each of said signal switches, and actuated at a selected step to close a circuit through said control device and the closed signal switch, to energize the signal device controlled by said closed signal switch and corresponding to the last operated register, the operation of which energized its one of said parallel-connected switches to effect movement of said control device through such selected circuit-closing step and closed the signal switch of such corresponding signal.

5. In a cash register system, in combination, a plurality of cash register drawers, a plurality of switches each closed by opening movement of a different drawer and opened by closing movement thereof, a plurality of signal circuits each including a different one of said switches, a plurality of signals, one connected in each signal circuit, a single control device movable step by step and including circuit-closing means in series with each of said switches and common to all said signal circuits and closed for periods of one step at intervals of a plurality of steps, and means actuated by operation of each of said registers to advance said control device one step for each operation of each register, to energize, upon a circuit-closing step of said control device, and through the closed one of said switches, only that signal corresponding to the cash register whose operation effected movement of said control device into circuit-closing position.

6. In a cash register system, in combination, a plurality of cash registers disposed remote from each other, an electrically operable signal device, a circuit-closing means operatively connected to said signal device to operate the latter when in circuit-closed position, and movable step-by-step from each circuit-closed position to the next, and arranged to require varying numbers of steps between successive circuit-closed positions, a control device movable step-by-step, and operatively connected to the circuit-closing means to advance the latter correspondingly, and means actuated by operation of each one of said cash registers to advance said control device and said circuit-closing device one step for each operation of each register.

FRANCIS B. O'BRIEN.